United States Patent [19]

King

[11] 4,365,906
[45] Dec. 28, 1982

[54] RIGGING TERMINAL ASSEMBLY
[76] Inventor: Kenneth L. King, 100 Robin Rd., Weston, Mass. 02193
[21] Appl. No.: 239,549
[22] Filed: Mar. 2, 1981
[51] Int. Cl.³ .......................... F16D 9/00; F16P 5/00
[52] U.S. Cl. ........................................ 403/2; 403/27; 403/157
[58] Field of Search ............................ 403/2, 27, 157
[56] References Cited
U.S. PATENT DOCUMENTS
3,846,030 11/1974 Katt ........................................ 403/2
3,922,104 11/1975 McCullough .......................... 403/2
3,960,456 6/1976 Norris ..................................... 403/2

Primary Examiner—W. L. Shedd

[57] ABSTRACT

A sailboat rigging fatigue indicating terminal assembly is provided for receiving and retaining the end of a tensioned metal rigging rod or the like subject to fatigue caused by vibration. It comprises a fitting having a securing portion at one end and an internal bore extending from its other end surrounding and securing the rod. At its outer rod receiving end, the fitting has a fatigue indicating portion defined by a weakened area, which may comprise an annular groove, spaced inwardly from the end of the fitting, which, upon breakage at the weakened area, releases the fatigue indicating portion to indicate decreased rod fatigue life.

5 Claims, 6 Drawing Figures

U.S. Patent  Dec. 28, 1982  4,365,906
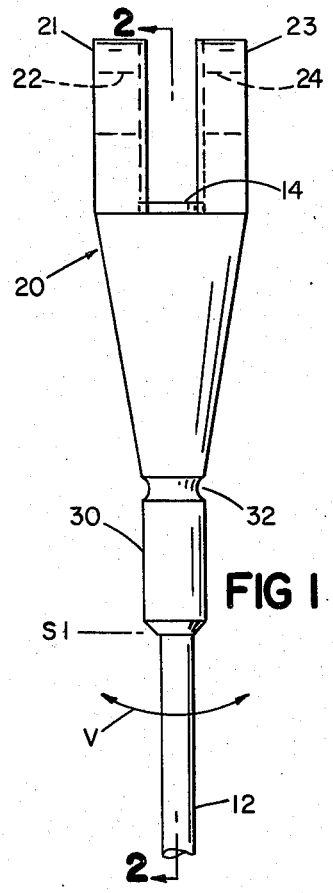
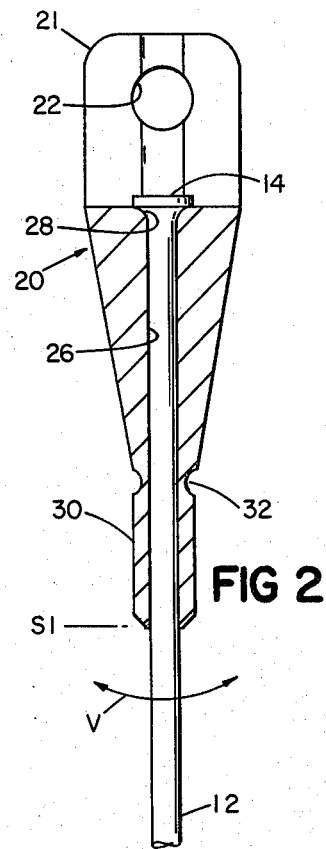
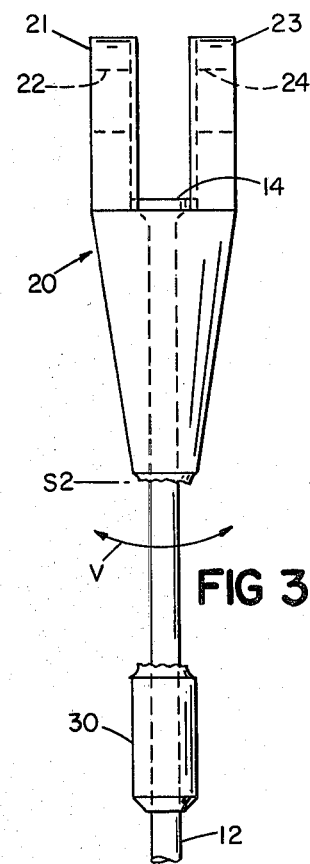
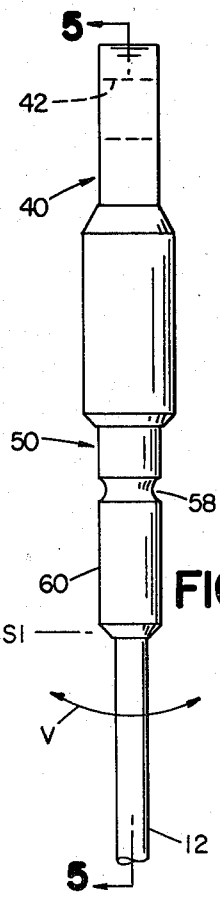
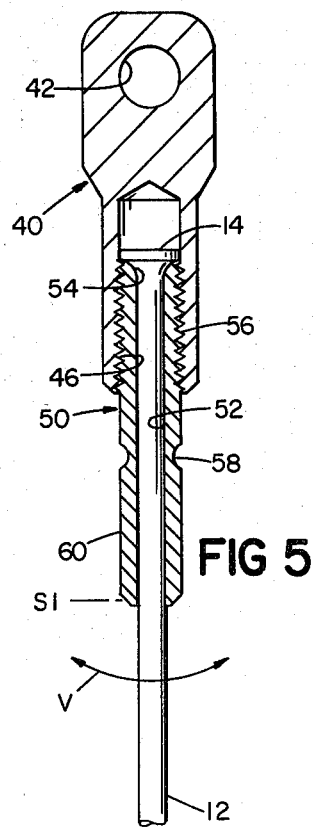
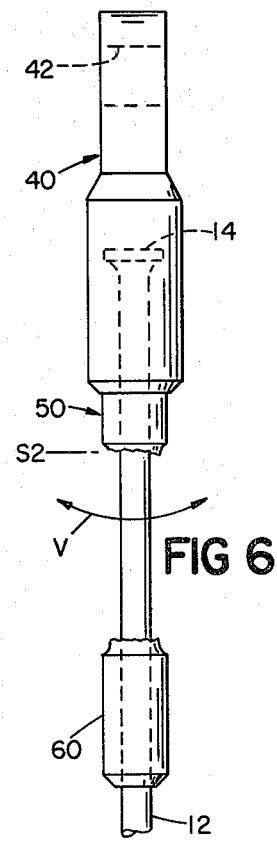

RIGGING TERMINAL ASSEMBLY

This invention relates to sailboat rigging rod terminal assemblies and the like for receiving and retaining the heads of tensioned metal rigging rods or the like subject to fatigue caused by vibration.

BACKGROUND OF THE INVENTION

My U.S. Pat. No. 3,874,805 describes sailboat rigging rod terminal fittings for receiving and retaining the heads of tensioned metal rigging rods which are widely used as standing rigging because of their ability to resist breakage caused by fatigue due to vibration, which usually occurs at the major stress point where the rod enters the fitting. However, if it is desired to make the rigging as light and small as possible, both to decrease weight aloft and to decrease wind resistance, in order to increase boat performance, there is the increased danger that breakage may occur. If it does, it usually occurs without warning and causes extensive damage to the boat mast and rigging. For this reason, conservative design practice dictates that standing rigging be made heavier and larger than the minimum desired, with the result that boat performance suffers.

Accordingly, it is a major object of the present invention to provide a novel sailboat rigging rod terminal fitting which makes it possible to use rigging rod or the like of lighter weight and smaller size than is conventional, in order to improve boat performance.

It is another object of the invention to provide such a terminal fitting which makes the associated rigging rod less subject to breakage.

It is still another object of the invention to provide such a terminal fitting in which breakage of the rod or the like is less likely to occur without warning.

SUMMARY OF THE INVENTION

In order to accomplish these objects, the present invention provides a sailboat rigging terminal assembly fitting for receiving and retaining the head of a tensioned rigging rod or the like subject to fatigue caused by vibration, which fitting is uniquely capable of indicating decreased fatigue life of the rod or the like by the breaking off of a portion of the fitting to release it to indicate decreased fatigue life. It may also automatically shift the major stress point of the rod or the like from a point adjacent the outer end of the fitting to another point adjacent the broken end of the fitting, in order to increase the fatigue life of the rod.

More specifically, these unique capabilities of the present invention are provided by a novel terminal assembly comprising a fitting, of suitable metal, plastic, or the like, having a securing portion at its securing end and an internal bore extending from its opposite rod receiving end toward its securing end and having, at its rod receiving end, a fatigue indicating portion defined by a weakened area, which may comprise an annular groove spaced inwardly from its rod receiving end.

In accordance with the invention, vibration transmitted from the rod or the like eventually causes the fitting to break at the weakened area before breakage of the rod occurs at its major stress point adjacent the outer end of the fitting. The resulting release of the fatigue indicating portion indicates decreased fatigue life of the rod at its major stress point adjacent the rod receiving end. If breakage occurs aloft, this portion may be arranged to slide down the rod for observation at deck level.

Additionally, the breaking off of the fatigue indicating portion shifts the first rod stress point inwardly to a second rod stress point adjacent the broken end of the fitting, which results in greatly increased fatigue life of the rod, since the major portion of rod stress and hence the possibility of rod breakage occurs at the point of its entry into the fitting.

BRIEF DESCRIPTION OF THE DRAWINGS

For the purpose of further explaining the above and still further objects and features of the invention, reference is now made to the following detailed description of a preferred embodiment thereof, taken together with the accompanying drawings; wherein;

FIG. 1 is a side view of one embodiment of a sailboat rigging rod fatigue indicating terminal assembly according to the invention;

FIG. 2 is a sectional view of the terminal assembly of FIG. 1, taken on line 2—2 thereof;

FIG. 3 is a view like that of FIG. 1 showing the fatigue indicating portion of the fitting released from the remainder of the fitting;

FIG. 4 is a side view of a second embodiment of a sailboat rigging rod fatigue indicating terminal assembly according to the invention;

FIG. 5 is a sectional view of the terminal assembly of FIG. 4, taken on line 5—5 thereof; and FIG. 6 is a view like that of FIG. 4 showing the fatigue indicating portion released from the remainder of the fitting.

DETAILED DESCRIPTION

Referring to the drawings, the sailboat rigging rod fatigue indicating terminal assembly fitting of the invention is used with a rigging rod 12 having a head 14, usually at both ends of rod 12, such as is disclosed in my U.S. Pat. No. 3,874,805, which is incorporated by reference herein. In general, it comprises a metal fitting, generally designated 20 (FIGS. 1–3) or 40 (FIGS. 3–6), having an internal rod receiving bore surrounding rod 12 and retaining its head 14 within the fitting.

In accordance with the embodiment of the invention shown in FIGS. 1, 2 and 3, the fitting 20 therein shown has, at its securing end, a generally U-shaped clevis having two legs 21 and 23 with aligned transverse securing pin holes 22 and 24 for receiving a conventional pin (not shown) for connecting it to any desired elements of the standing rigging of a sailboat. An internal bore 26 extends inwardly from its opposite rod receiving end and has, at its inner end adjacent the securing end of fitting 20, an annular concave rod head seating surface 28. At its outer rod receiving end, fitting 20 has a fatigue indicating portion 30 defined by a weakened area formed by annular groove 32 spaced inwardly from the outer rod receiving end of fitting 20. The relative diameters of bore 26 and rod 12, at least within fatigue indicating portion 30, are such as to provide a sliding fit of fitting 20 on rod 12.

In accordance with the embodiment of the invention shown in FIGS. 4, 5 and 6, the fitting 40 therein shown has a transverse securing pin hole 42 at its securing end for receiving a conventional pin (not shown) for connecting it to any desired elements of the standing rigging of a sailboat. An internally threaded bore 46 extends inwardly from its opposite rod receiving end toward its securing end. An internal sleeve 50 has a central rod-receiving bore 52 and, at its inner end adjacent the securing end of fitting 40, an annular concave rod head seating surface 54 with an externally threaded portion 56 adjacent thereto mounted in internally threaded fitting bore 46 and extending toward its outer rod receiving end. At its outer rod receiving end, sleeve 50 has a fatigue indicating portion 60 defined by a weakened area formed by annular groove 58 spaced inwardly from the outer rod receiving sleeve end of fitting 40. The relative diameters of bore 52 and rod 12, at least within fatigue indicating portion 60, are such as to provide a sliding fit on rod 12.

During use of the sailboat rigging rod terminal assembly of the invention, transverse vibration, indicated by the arcuate double ended arrows V in the drawings, transmitted from rod 12 to the rod receiving end of fitting 20 or 40, causes fatigue indicating portion 30 or 60 to break off at annular groove 32 or 58 before breakage of rod 12 occurs at its major stress point S1 adjacent the outer rod receiving end of fitting 20 or 40. The resulting release of the fatigue indicating portion 30 or 60, as indicated in FIGS. 3 and 6, indicates seriously decreased fatigue life of rod 12. If breakage occurs aloft, fatigue indicating portion 30 or 60 will slide down rod 12 for observation at deck level.

Additionally, as best shown in FIGS. 3 and 6, the breaking off of fatigue indicating portion 30 or 60 shifts the initial rod stress point S1 to another rod stress point S2 longitudinally spaced from rod stress point S1 and adjacent the broken end of fitting 20 or 40. This results in greatly increased fatigue life of rod 12, since the major portion of initial rod stress and hence the possibility of rod breakage occurs at the point of its entry into the lower end of fitting 20 or 40.

Thus, the novel sailboat rigging rod terminal assembly of the invention is uniquely capable, not only of indicating seriously decreased fatigue life of rod 12 at its first rod stress point S1 by the release of fatigue indicating portion 30 or 60, but also of automatically shifting the major stress point S1 of rod 12 to another stress point S2 adjacent the broken end of the fitting 20 or 40, in order to increase the fatigue life of rod 12.

Modifications of the invention, within the spirit thereof and the scope of the appended claims, such as the substitution of stranded wire rigging for rod rigging, will occur to those skilled in the art.

What is claimed is:

1. A sailboat rigging fatigue indicating terminal assembly for receiving and retaining the end of a tensioned metal rigging rod or the like subject to fatigue caused by vibration, comprising a fitting having securing means at its securing end and an internal bore extending from its opposite rod receiving end toward said securing end surrounding and securing said rod and having at its rod receiving end a fatigue indicating portion defined by a weakened area spaced inwardly from its rod receiving end whereby breakage of said fitting at said weakened area releases said fatigue indicating portion from the remainder of said fitting to indicate decreased fatigue life of said rod.

2. A sailboat rigging fatigue indicating terminal assembly for receiving and retaining the annular convex inner seating surface of the head of a tensioned metal rigging rod or the like subject to fatigue caused by vibration, comprising a fitting having securing means at its securing end and an internal bore extending from its opposite rod receiving end toward said securing end surrounding said rod and having adjacent its securing end an annular concave rod head seating surface, and at its rod receiving end a fatigue indicating portion defined by a weakened area spaced inwardly from its rod receiving end whereby breakage of said fitting at said weakened area releases said fatigue indicating portion from the remainder of said fitting to indicate decreased fatigue life of said rod.

3. A sailboat rigging fatigue indicating terminal assembly for receiving and retaining the annular convex inner seating surface of the head of a tensioned metal rigging rod or the like subject to fatigue caused by vibration, comprising a fitting having securing means at its securing end and an internally threaded bore extending from its opposite rod receiving end toward said securing end, and a rod receiving sleeve surrounding said rod and threadedly mounted within said bore and having at its inner end an annular concave rod heat seating surface with an externally threaded portion adjacent thereto received in said internally threaded bore and extending toward its outer rod receiving end and at its outer rod receiving end a fatigue indicating portion defined by a weakened area spaced inwardly from its outer rod receiving end whereby breakage of said sleeve at said weakened area releases said fatigue indicating portion to indicate decreased fatigue life of said rod.

4. A terminal assembly as claimed in claim 1, 2, or 3, wherein said fatigue indicating portion has a sliding fit on said rod.

5. A terminal assembly as claimed in claim 1, 2, 3 or 4, wherein said weakened portion comprises an annular groove around said sleeve.

* * * * *